Sept. 19, 1944.  C. GERST  2,358,492
CLUTCH STRUCTURE
Filed July 31, 1942  4 Sheets-Sheet 1
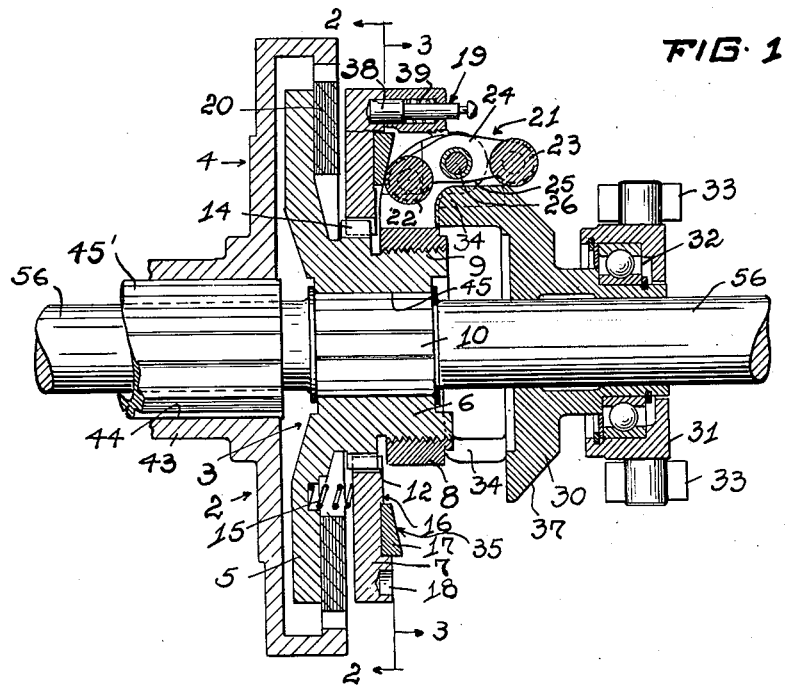
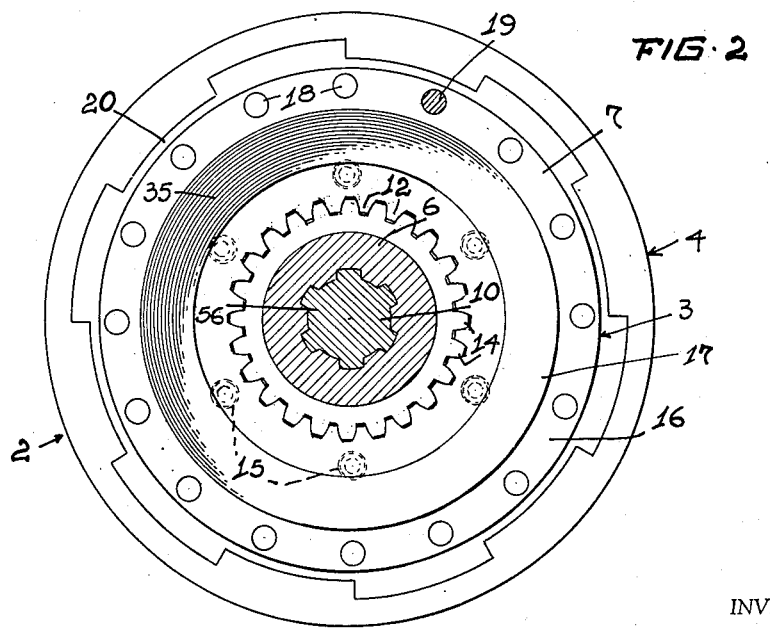
INVENTOR.
CHRIS GERST
BY
ATT.

Sept. 19, 1944.  C. GERST  2,358,492
CLUTCH STRUCTURE
Filed July 31, 1942  4 Sheets-Sheet 2
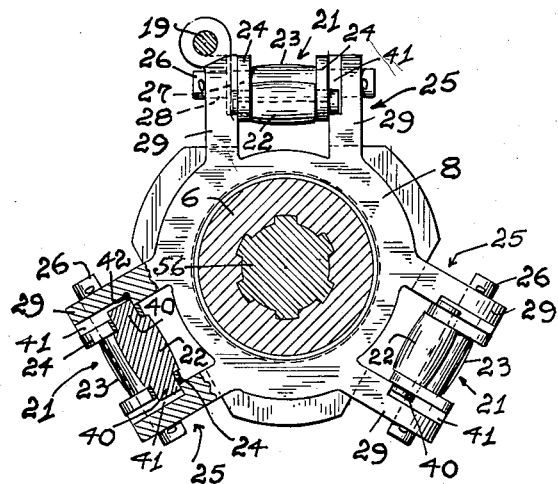
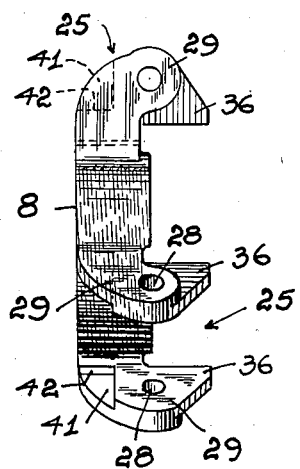
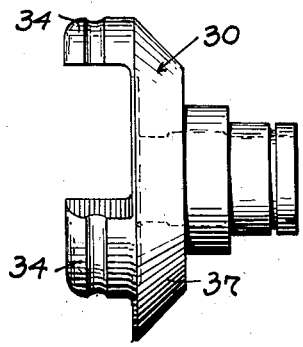
INVENTOR.
CHRIS GERST
BY Sept. 19, 1944.  C. GERST  2,358,492
CLUTCH STRUCTURE
Filed July 31, 1942  4 Sheets-Sheet 3

INVENTOR.
CHRIS GERST
BY Gustav A. Wolff
ATT.

Sept. 19, 1944.   C. GERST   2,358,492
CLUTCH STRUCTURE
Filed July 31, 1942   4 Sheets-Sheet 4

INVENTOR.
CHRIS GERST
BY Gustav A. Wolff
ATT

Patented Sept. 19, 1944

2,358,492

UNITED STATES PATENT OFFICE 2,358,492

CLUTCH STRUCTURE

Chris Gerst, Dearborn, Mich., assignor, by mesne assignments, to Transmission Specialties Company, Detroit, Mich., a corporation of Michigan Application July 31, 1942, Serial No. 453,057

6 Claims. (Cl. 192—68)

This invention relates in general to clutches and more particularly to friction type clutches useful in transmitting power from an engine or any other source of power to a transmission or power take-off.

The principal object of this invention is the provision of a friction type clutch which is particularly suited for extremely high speeds, will transmit power from an engine or any other source of power to a driven member such as a train of gears etc., and simultaneously permit continuous driving of another clutch or other auxiliary devices such as pumps, instruments etc., all of which for proper performance must rotate continuously with the engine or the source of power.

The two clutch constructions disclosed herein which are similar in their general construction, are designed for co-operation in transmissions in which the direction of rotation must be reversible, such as marine transmissions, tank transmissions, or transmissions to reverse mixers etc., however, this invention is not to be limited to the use of the clutches in pairs, since either one of the two constructions may be used individually for transmitting power from a driving to a driven member.

Another object of this invention is the provision of friction type clutches which when used together in a forward and reverse transmission will add to the smoothness of the engine, or power source. This is accomplished by arranging the heavy portions of these clutches as driving members, and the extremely light portions of these clutches as driven members. Such an arrangement is highly important in a reversing transmission, in which case the heavy portion of the clutch is connected to the flywheel of the engine so that the inertia of the continuously revolving heavy clutch member materially contributes to a smooth running of the engine.

This arrangement furthermore avoids transmitting of vibrations or undesirable noises to a transmission due to the fact that the inertia of the driven members is very low, so that the transmission starts and stops very readily.

A further object of this invention is the provision of friction type clutches with ruggedly constructed and properly positioned toggle mechanism to effect an appreciable increase in the clutch capacity.

Still another object of this invention is the provision of friction type clutches with means effecting positive release of pressure applying mechanism for quick positive disengagement of these clutches.

These objects of the invention are attained by mounting the driving clutch member of a friction type clutch on a drive shaft and the driven clutch member on a tubular driven shaft sleeved upon the drive shaft so that the latter extends outwardly of the tubular shaft and permits a direct connection with other members to be driven thereby.

A still further object of the invention therefore is the provision of improved clutch means of the type referred to above in which the driven clutch member embodies an axial bore larger than the axial bore of the driving clutch member so as to permit the driving shaft being freely extended through the tubular driven member carrying the driven clutch member.

Still another object of the invention is the provision of improved clutch means of the type referred to above embodying a single or multiple plate clutch, the plate or plates of which form the driven clutch member and are frictionally and releasably held between shiftable parts of the driving clutch member.

Additional objects and novel features of construction, combinations and relations of parts by which the objects in view have been attained will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a sectional view through a single plate clutch built in accordance with the invention;

Fig. 2 is a cross-sectional view through the clutch shown in Fig. 1, the section being taken on line 2—2 of Fig. 1;

Fig. 3 is another cross-sectional view through the clutch shown in Fig. 1, the section being taken on line 3—3 of Fig. 1;

Fig. 4 is a side-view of the clutch ring which mounts the shifting fingers for the pressure plate;

Fig. 5 is a side view of the cone actuating the shifting fingers;

Figure 6:
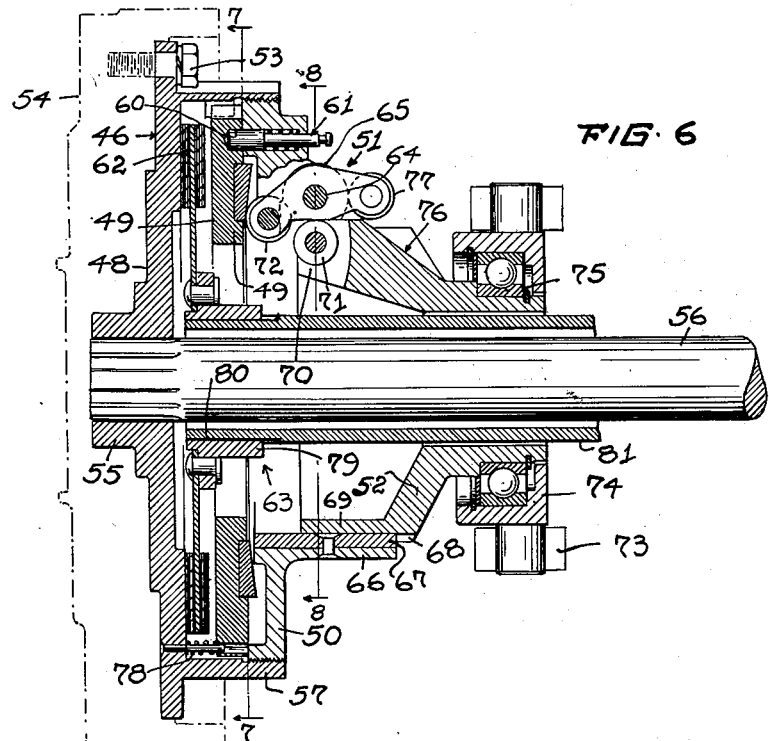
Fig. 6 is a sectional view through a somewhat modified form of a single plate clutch built in accordance with the invention.

Referring now to the structure shown in Figs. 1 through 5 of the drawings, it will be seen that single plate clutch 2 embodies a drive member 3 and a driven member 4 mounted for frictional and clamping engagement with member 3. For such purpose member 3 includes a clutch plate 5 formed with a splined hub 6, a pressure plate ring 7, slidably and non-rotatably sleeved on hub 6, and a clutch ring 8 threadedly connected with the threaded portion 9 of the splined hub, which latter engages splined portion 10 of a clutch shaft 56. Pressure plate ring 7 has teeth 12 arranged on its inner edge, and these teeth co-operate with correspondingly shaped teeth 14 on hub 6 in slidably and non-rotatably coupling said hub with pressure plate ring 7, which latter is yieldingly forced away from the clutch plate by a plurality of coil springs 15 arranged between clutch plate 5 and plate ring 7. Pressure plate ring 7 furthermore embodies in its rear face 16 a ring member 17 and a plurality of evenly spaced circular recesses 18 which co-operate with a spring-pressed plunger-like locking pin 19 on clutch ring 8 to effectively lock shifting finger supporting clutch ring 8 in its adjusted position with respect to clutch plate 5.

The pressure plate ring 7, when shifted toward clutch plate 5, effects frictional clamping of a molded friction clutch disk 20, which disk is attached to clutch member 4 and in its clamped position effects a coupling between clutch members 3 and 4.

The pressure plate ring 7 is shifted toward clutch plate 5 by symmetrically arranged clutch finger assemblies 21, each of which embodies a pair of rollers 22, 23 rotatably mounted between spaced oppositely arranged finger plates 24. These clutch finger assemblies are pivotally supported by clutch ring 8 which, for such a purpose, is provided with radially arranged, fork-shaped extensions 25 and which supports these assemblies on shafts 26 which are extended through bores 27 in finger plates 24 and supported in other bores 28 in the oppositely arranged ear portions 29 of extensions 25.

Actuation of clutch finger assemblies 21 is effected by a shifting cone 30 which is coupled with a throw-out collar 31 by a ball bearing 32 and actuated by a fork 33. This shifting cone is slidably mounted on clutch shaft 56 and, when shifted toward clutch plate 5, engages with its extended rounded jaws 34 the rollers 22 of the clutch finger assemblies and effects tilting of the assemblies and shifting of their rollers 22 outwardly on the inclined surface 35 of the pressure ring member 17 and therewith shifting of pressure plate ring 7 toward clutch disk 20 until the latter is tightly gripped between clutch plate 5 and pressure plate ring 7.

The shifting cone 30 is slidably and non-rotatably coupled with clutch ring 8 by dimensioning jaw members 34 so that these members snugly and slidably fit between ear portions 29 of extensions 25, which ear portions include guide extensions 36 to effect proper coupling between shifting cone 30 and clutch ring 8 under all conditions. When shifting cone 30 is shifted in an opposite direction, that is away from clutch plate 5, then the cone-shaped peripheral surface 37 of the shifting cone effects positive tilting of the clutch finger assemblies in an opposite direction and thus permits free shifting of pressure plate ring 7 away from clutch disk 20 by coil springs 15.

As previously stated, clutch ring 8 mounts a spring-pressed, plunger-like locking pin 19 which embodies a plunger 38 pressed by a spring 39 toward pressure plate ring 7. For adjustment of the clutch this pin, which locks the clutch ring in adjusted position by entering into one of the circular recesses 18 in the slidably and non-rotatably supported pressure plate ring 7, is forcibly shifted out of engagement with such a recess to free the clutch ring 8 and permit rotation and therewith shifting of the clutch ring by its threaded connection with hub 6. When pressure plate 7 is brought into suitable position, then clutch ring 8 is slightly rotated to align and interlock its locking pin with a recess 18.

To avoid excessive tilting of the clutch finger assemblies 21 by centrifugal force, rollers 22 of these assemblies are formed with studs 40 which extend into recesses 41 of ear portions 29 and by contact with shoulders 42 of the recesses limit tilting of the assemblies.

The driven member 4 of the clutch which mounts clutch disk 20 is formed with a splined hub 43 having a splined bore 44 which is substantially larger than shaft 56. This arrangement permits the driven clutch member 4 being splined to a tubular shaft 45', so that the shaft 56 can be extended through the bore of the tubular shaft and may drive clutch member 3 and, in addition, an independent rotary device.

Figure 7:
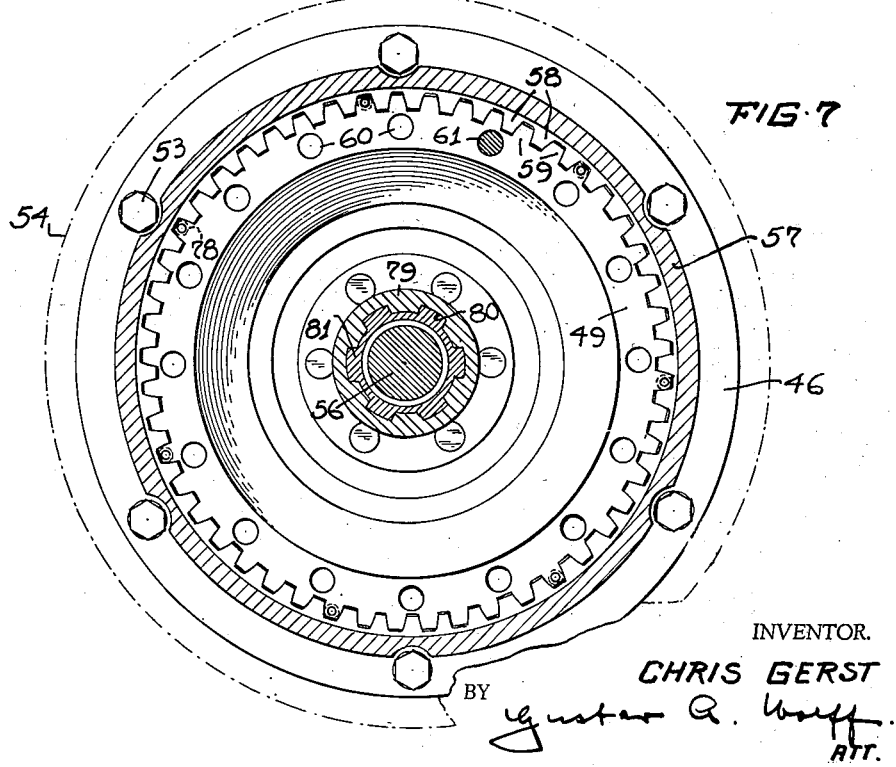
Fig. 7 is a cross-sectional view through the clutch shown in Fig. 6, the section being taken on line 7—7 of said figure.
Figure 8:
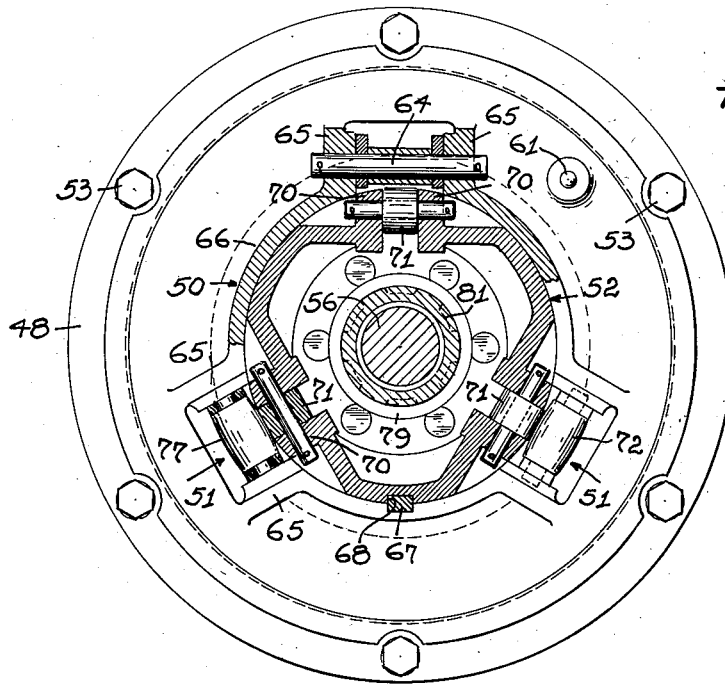
Fig. 8 is another cross-sectional view through the clutch shown in Fig. 6, the section being taken on line 8—8 of said figure.
Figures 9, 10:
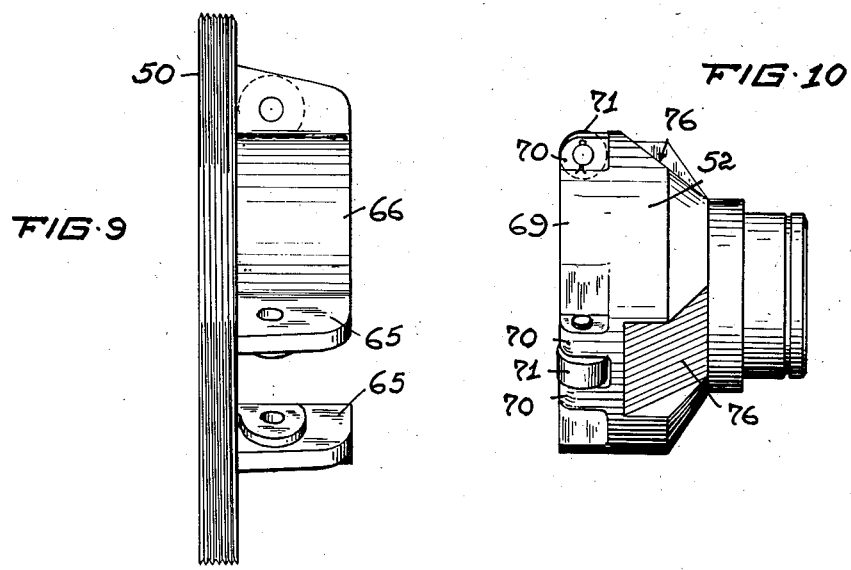
Fig. 9 is a side-view of the clutch ring of the clutch structure shown in Fig. 6, which ring mounts the shifting fingers for the pressure plate.
Fig. 10 is a side-view of the cone of the clutch structure shown in Fig. 6, actuating the shifting fingers.

Whereas the above described clutch construction has its driven member arranged adjacent to the driving member, the modified form of clutch construction shown in Figs. 6 through 10 has its driven clutch member fully enclosed and encircled by a driving clutch member. This latter form of clutch construction is specifically adapted for use in transmissions having two or more clutches arranged in axial alignment with each other, as the clutch can readily be mounted against the flywheel of an engine and effect driving of another clutch or clutches of the type disclosed in Figs. 1 through 5 by a driving shaft which is extended from the driving clutch member. This clutch construction which, as shown, is attached to a flywheel, embodies a driving clutch member 46 having a clutch driving or auxiliary driving hub 48, a pressure plate ring 49 and a clutch ring 50 with shifting finger assemblies 51 actuated by a clutch cone 52. Driving clutch member 46 is secured by bolts 53 to the flywheel 54 of an engine (not shown) and mounts in its splined hub portion 55 a splined shaft 56 arranged to drive any rotary device, such as another clutch, pump, air compressor, instruments etc. This driving clutch member 46 furthermore is formed with a circumferential flange 57 which slidably mounts pressure plate ring 49 by its teeth 58 co-operating with the toothed edge 59 of pressure plate ring 49. The flange 57 also supports clutch ring 50 which is threadedly connected with said flange and thus coupled with clutch member 46. A plurality of circular recesses 60 in pressure plate ring 49 permit of locking the clutch ring 50 in the desired adjusted position by a spring-pressed, plunger-like locking pin 61. Clutch member 46 and pressure plate ring 49 co-operate in frictionally clamping a clutch disk 62 which is directly connected with the driven member 63 of the clutch construction. Such a clamping action is effected by the shifting finger assemblies 51 which are pivotally mounted on shafts 64 arranged in the ear portions 65 of the flanged portion 66 of clutch ring 50. The shifting finger assemblies 51 are similar to the shifting finger assemblies 21 previously described and actuated by clutch cone 52. This cone, which is slidably extended into the flanged portion 66 of clutch ring 50 and non-rotatably coupled therewith by a key 67 sliding in a key slot 68 in wall 69 of clutch cone 52, mounts in ear portions 70 rollers 71. These rollers co-operate with the rollers 72 of the shifting finger assemblies 51 and effect shifting of the pressure plate ring 49 when cone 52 is shifted toward clutch ring 50 by a fork 73 actuating a throwout collar 74 in turn coupled with the cone by a ball bearing 75. The clutch cone 52 includes in its peripheral wall inclined recesses 76 which co-operate with the rollers 77 of the shifting finger assemblies in releasing these assemblies from their engagement with rollers 71 and permit of free shifting of the pressure plate ring away from clutch disk 62 by coil springs 78.

The driven clutch member 63 which mounts clutch disk 62 is formed with a splined hub 79, the splined bore 80 of which is substantially larger than the splined bore in the hub portion 55 of the driving clutch member 46. This arrangement permits the driven clutch member 63 being splined to a tubular shaft 81 and extension of shaft 56 through the bore of the tubular shaft so that driving clutch member 46 and its shaft 56 may be used for rotation of rotary devices independent of the clutch.

Having thus described my invention, what I claim is:

1. In a clutch a backing plate, a floating clamping plate slidably coupled with said backing plate, and means adapted to shift said clamping plate, said shifting means including clutch finger assemblies, a ring member pivotally supporting said assemblies and threadedly connected with said backing plate for adjustment with respect thereto, and a shifting cone member slidably and non-rotatably coupled with said ring member, said shifting cone member having peripheral portions contacting said clutch finger assemblies to effect positive shifting of said assemblies in clutching and clutch releasing operations when said cone member is shifted in opposite directions.

2. In a clutch a clutch plate including a hub portion, a floating clamping plate slidably supported by said hub portion, and means adapted to shift said clamping plate toward said clutch plate, said shifting means including a ring member threadedly coupled with the hub portion for adjustment with respect thereto, fork-shaped supporting means on said ring member, clutch finger assemblies of the dual lever type pivotally mounted in said fork-shaped supporting means, and a shifting cone for actuating said clutch finger assemblies, said shifting cone including jaw members slidably extended into said fork-shaped supporting means to effect a driving connection between said ring member and said shifting cone.

3. In a clutch a clutch plate including a hub portion, a floating clamping plate slidably supported by said hub portion, and means adapted to shift said clamping plate, said shifting means including a ring member threadedly connected with said hub portion for adjustment with respect thereto, fork-shaped supporting means extended from said ring member including guiding extensions, clutch finger assemblies of the dual lever type pivotally mounted in said fork-shaped supporting means, and an actuating cone for said clutch finger assemblies adapted to shift same in opposite directions, said actuating means including extended jaw members dimensioned to slidably extend into said fork-shaped supporting means between its guiding extensions to effect a direct driving connection between said ring member and said actuating cone.

4. In a clutch a clutch plate including a hub portion, a floating clamping plate slidably supported by said hub portion, and means adapted to shift said clamping plate, said shifting means including a ring member threadedly coupled with the hub portion for adjustment with respect thereto, fork-shaped supporting means on said ring member provided with locking means to secure said ring member in its adjusted position with respect to said floating clamping plate, clutch finger assemblies of the dual lever type pivotally supported in said fork-shaped supporting means, and a shifting cone directly actuating upon said clutch finger assemblies in shifting same in opposite directions, said shifting cone including jaw members extended into said fork-shaped supporting means to effect a direct driving connection between said ring member and said shifting cone.

5. A clutch as described in claim 2, wherein said fork-shaped supporting means and said clutch finger assemblies include means adapted to limit the shifting of said assemblies in their inoperative positions.

6. A clutch as described in claim 1, wherein said clutch finger assemblies are of the dual lever type, wherein said shifting cone member includes at its front portion rollers cooperating in clutching operations with the front ends of said levers, and wherein said shifting cone member includes at its rear end cam portions cooperating in clutch releasing operations with the rear ends of said levers.

CHRIS GERST.